United States Patent [19]
Wedin

[11] Patent Number: 5,904,395
[45] Date of Patent: May 18, 1999

[54] HINGE ARRANGEMENT

[75] Inventor: Sten Wedin, Västra Frölunda, Sweden

[73] Assignee: AB Volvo, Sweden

[21] Appl. No.: 08/805,160

[22] Filed: Feb. 24, 1997

[30] Foreign Application Priority Data

Feb. 27, 1996 [SE] Sweden ................................. 9600729

[51] Int. Cl.⁶ .................................................... B60J 7/20
[52] U.S. Cl. ..................................... 296/136; 296/107.08
[58] Field of Search .............................. 296/136, 107.08, 296/76; 49/381

[56] References Cited

U.S. PATENT DOCUMENTS

| | | | |
|---|---|---|---|
| 1,656,441 | 1/1928 | Maise ......................................... | 296/76 |
| 1,809,505 | 6/1931 | Campbell ............................ | 296/107.08 |
| 2,800,361 | 7/1957 | Kubacka ........................ | 296/107.08 X |
| 4,343,504 | 8/1982 | Tomioka et al. .......................... | 296/76 |
| 5,338,085 | 8/1994 | Guckel et al. .......................... | 296/121 |

FOREIGN PATENT DOCUMENTS

| | | |
|---|---|---|
| 0 638 453 A1 | 2/1995 | European Pat. Off. . |
| 762309 | 4/1934 | France .............................. 296/107.08 |
| 41 39 247 A1 | 6/1993 | Germany . |
| 544406 | 10/1954 | Italy ........................................ 296/76 |

*Primary Examiner*—Dennis H. Pedder
*Attorney, Agent, or Firm*—Lerner, David, Littenberg, Krumholz & Mentlik, LLP

[57] ABSTRACT

Hinge arrangements for pivotally supporting a lid covering a storage compartment of a convertible roof in a vehicle are disclosed, including a first hinge fixed to the lid, and a second hinge fixed to the vehicle, the ends of both hinges being pivotally arranged about a common pivot axis which is disposed at or above the plane of the lid.

5 Claims, 4 Drawing Sheets

HINGE ARRANGEMENT

FIELD OF THE INVENTION

The present invention relates to a hinge arrangement. More particularly, the present invention relates to a hinge arrangement intended for supporting a lid in a vehicle, which lid is intended to cover a storage compartment of a convertible roof.

BACKGROUND OF THE INVENTION

Certain cars are of the convertible type, which comprise a convertible roof, i.e. a roof for the occupant compartment which can be raised and lowered. The roof can be raised and lowered either automatically, by means of a power device, or manually. When it assumes its lowered condition, the roof is normally stored in a particular storage compartment which is arranged near the luggage compartment of the vehicle.

The storage compartment of the roof can be shaped as a tub which extends across the vehicle and which is covered by a lid, the shape of which corresponds to the dimensions of the tub. The lid is pivotally arranged by means of a hinge arrangement. When the roof is to be raised, the lid is first opened, after which the roof is raised out of the storage compartment. Thereafter, the lid can then be swung down so as to cover the now empty storage compartment. Next, the roof is secured at its front and rear, normally along the upper edge of the windscreen and behind said lid, respectively. In this manner, the roof can be arranged over the occupant compartment of the vehicle.

When the roof is lowered, the above-described operation is reversed. In this regard, the roof is first released at its front and rear edges. Thereafter, the lid of the storage compartment of the roof is opened and the roof is lowered and stowed in said compartment. Next, the lid of the storage compartment is closed.

A previously known arrangement of the above-described type which includes a roof which can be raised and lowered, is shown in U.S. Pat. No. 5,338,085. In this regard, the roof can be stowed in a space adjacent to the luggage compartment of the vehicle. The storage compartment of the roof is covered by a lid which is pivotally arranged by means of a hinge arrangement. From this patent it is evident that this arrangement creates a problem due to the fact that the hinge arrangement encroaches significantly on the space available in the vehicle. In this regard, the hinges are formed by two bent, tubular elements which are arranged in an axis of rotation. These elements require a large amount of space when the lid is to be raised or lowered, which results in the above-mentioned problem.

Another problem associated with these known arrangements is that when the lid of the storage compartment of the roof is to be opened, it will be swung so that its rear edge is positioned partly above the luggage compartment of the vehicle. This results in the luggage compartment lid having to be closed before the lid of the roof can be opened. Otherwise, if the luggage compartment lid were to be opened when the roof lid is opened, either or both of the ids could be damaged.

A principle object of the present invention is to solve the above-mentioned problems and to provide an improved hinge arrangement which in particular is intended for a lid of a storage compartment for a convertible roof in a vehicle.

A particular object of the present invention is to provide a hinge arrangement which encroaches as little as possible on the available space in the vehicle.

A further object of the present invention is to provide a hinge arrangement which allows pivoting of the lid of the storage compartment of the roof, in a manner so as to allow this lid to be open at the same time as the luggage compartment of the vehicle is open.

SUMMARY OF THE INVENTION

These and other objects have now been realized by the invention of apparatus for pivotally supporting a lid pivotable between an open position and a closed position and disposed in a predetermined plane covering a convertible roof storage compartment in a vehicle, which apparatus comprises a first hinge element having a first end and a second end, the first end of the first hinge element being fixed to the lid, and a second hinge element having a first end and a second end, the first end of the second hinge element being fixed to the vehicle, the second ends of the first and second hinge elements being pivotably arranged about a common pivot axis, the common pivot axis being disposed at or above the predetermined plane of the lid. Preferably, the predetermined plane of the lid is essentially horizontal when the lid is in the closed position.

In accordance with one embodiment of the apparatus of the present invention, the vehicle includes a luggage compartment and a wall separating the luggage compartment from the roof storage compartment, the first end of the second hinge element being fixed to the wall of the vehicle.

In accordance with another embodiment of the apparatus of the present invention, the first ends of the first and second hinge elements comprise flat iron elements and the second ends of the first and second hinge elements comprise a hinge shaft extending therethrough.

In accordance with another embodiment of the apparatus of the present, the lid includes an opening, and the second ends of the first and second hinge elements protrude at least partially through that opening. Preferably, the apparatus includes at least one housing covering the second ends of the first and second hinge elements which protrude at least partially through the opening. In a preferred embodiment, the at least one housing includes a brake light for the vehicle.

In view of the fact that the present invention includes two hinge elements which are arranged on the lid and on the vehicle, respectively, and which are pivotally arranged about a common axis which is arranged essentially flush with or above the plane which is defined by the lid, a simple and space-saving hinge arrangement is provided. The hinge elements thus encroach on the space available in the vehicle only to a small degree. Furthermore, the lid can be operated at the same time as the luggage compartment lid of the vehicle is opened.

BRIEF DESCRIPTION OF THE DRAWINGS

The present invention may be more fully appreciated with reference to the following detailed description, which, in turn, refers to the drawings in which.

DETAILED DESCRIPTION

Figure 1:
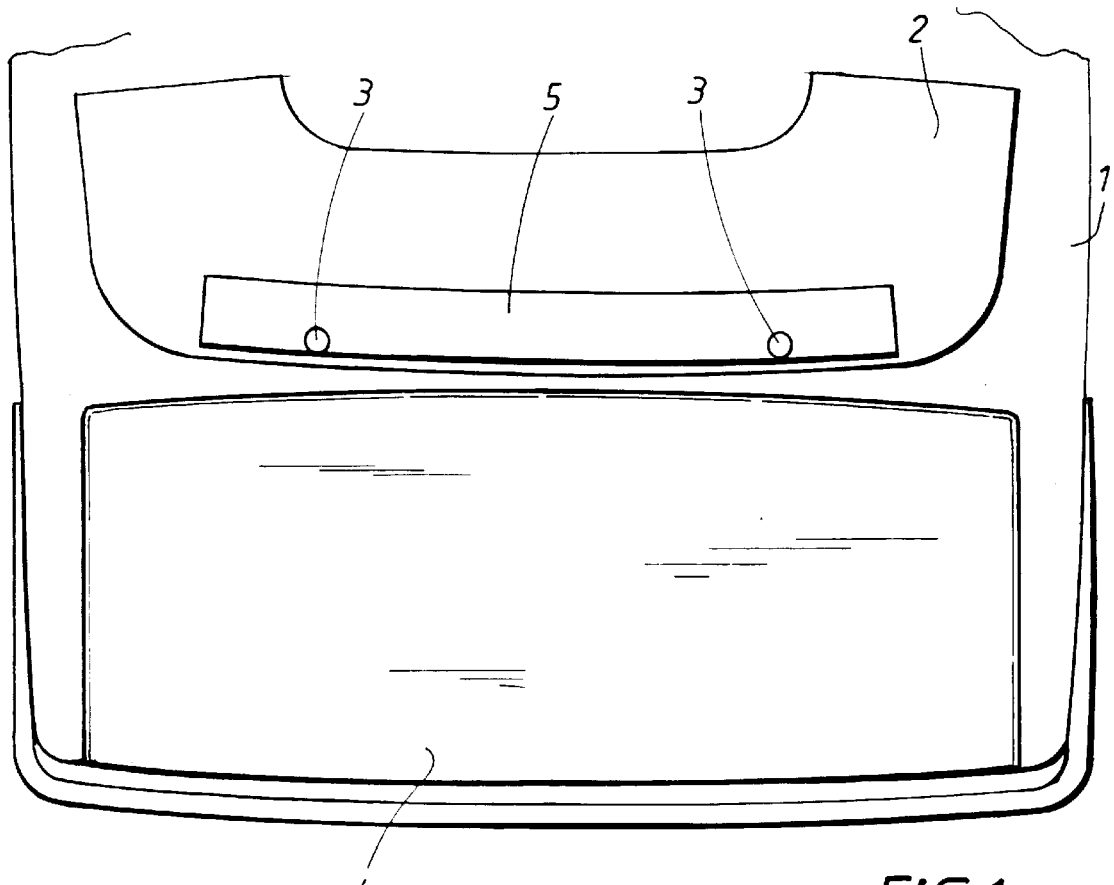
FIG. 1 is a top, elevational, partial view of the rear section of a motor vehicle provided with a convertible roof.

Referring to the Figures, in which like reference numerals refer to like elements thereof, FIG. 1 is a simplified view from above of the rear section of a vehicle 1 in the form of a convertible car, which comprises a convertible roof (not shown in the drawing) which can be raised and lowered. When the roof is in its lowered position, it is stowed in a storage compartment which is covered by a lid 2. The lid 2 is pivotally arranged about an axis of rotation which is defined by two hinges 3. The design and operation of the hinges will be described in greater detail below. Furthermore, the vehicle 1 comprises a conventional luggage compartment lid 4.

In accordance with the embodiment shown in FIG. 1, the lid 2 is provided with a transversely arranged, essentially box-shaped bracket 5 which is used as a housing for a brake light (not shown), i.e. a warning light which lights up when the driver presses the brake pedal. As is evident from the drawing, the bracket 5 is preferably of such a length that it extends over the hinges 3. This results in the hinges 3 being hidden within the bracket 5. Alternatively, the bracket 5 may be formed by a mounting for a spoiler or the like.

Figure 2:
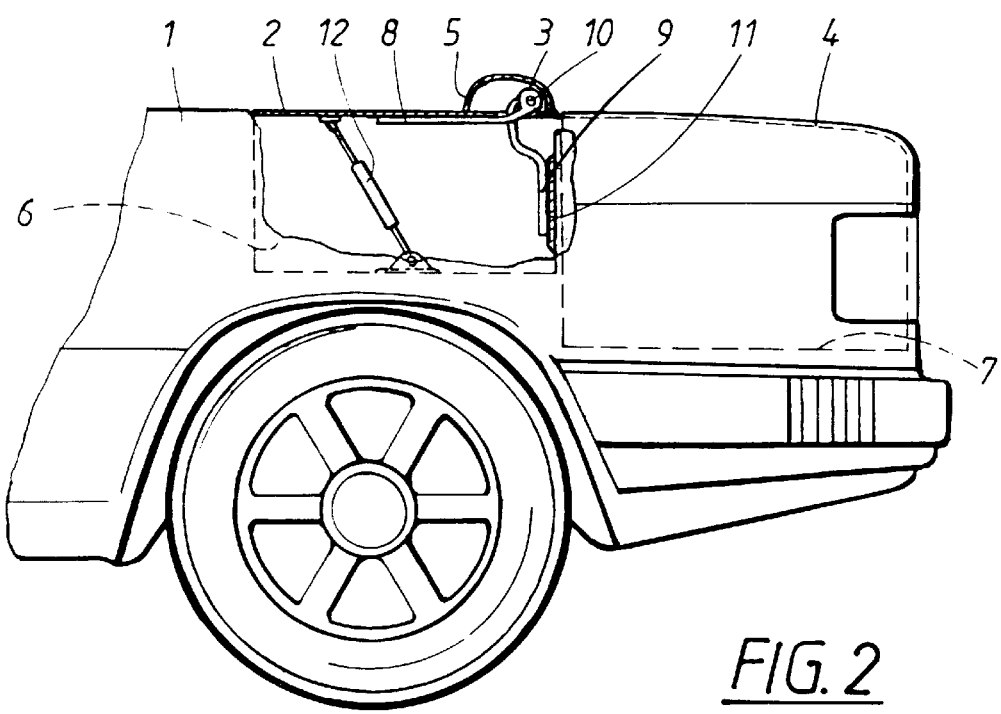
FIG. 2 is a partial, side, partially sectional view of the vehicle shown in FIG. 1.

FIG. 2 is a side view of the vehicle 1 shown in FIG. 1. From FIG. 2 it is evident that the storage compartment 6 of the roof is arranged just in front of the luggage compartment 7, which in turn is covered by the luggage compartment lid 4.

The hinge 3 is designed as two hinge elements in the form of a first hinge arm 8 and a second hinge arm 9, which are pivotally arranged about a shaft 10 which defines an axis of rotation for the hinge 3. The first hinge arm 8 is fixed to the underside of the lid 2, whereas the second hinge arm 9 is fixed in a supporting structural element 11 which preferably constitutes a part of a partition between the storage compartment 6 of the roof and the luggage compartment 7.

In accordance with the present invention, the hinge 3 is arranged so that the shaft 10, and therefore also the axis of rotation of the hinge 3, are arranged at least on the same level as the lid 2, and preferably above the lid 2. As is evident from FIG. 2, the axis of rotation of the hinge 3 extends generally horizontally and above the generally horizontal plane which is defined by the lid 2 when the lid is closed.

Furthermore, the lid 2 can be actuated to be opened and closed by means of a power device 12 which is fixed in the vehicle. The power device 12 is preferably of the hydraulic type which, in a manner which is known, can be remotely controlled when the roof is to be raised or lowered.

Figure 3:
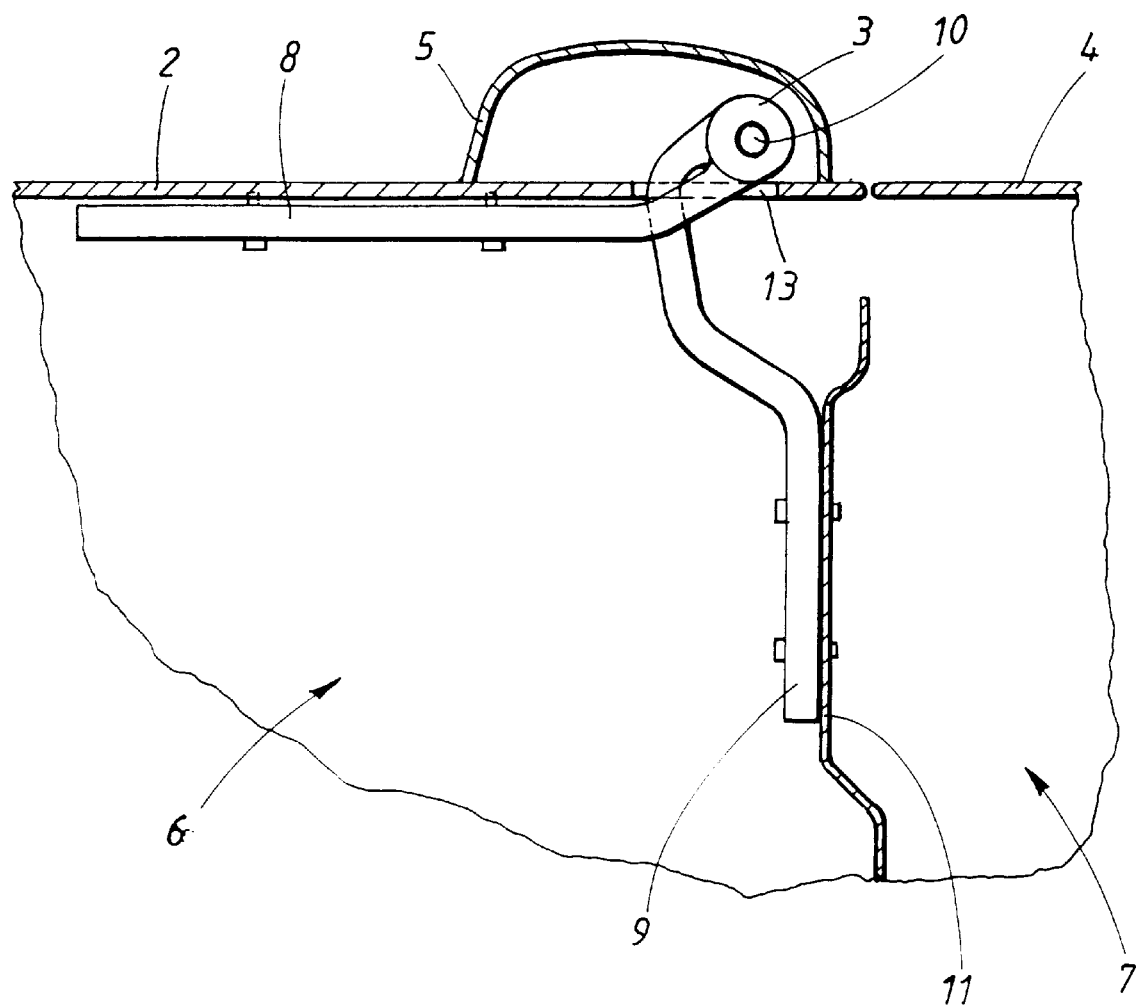
FIG. 3 is an enlarged, side, partial sectional view of the hinge arrangement according to the present invention in a first position.

FIG. 3 shows a slightly enlarged side view of the hinge 3. The first arm 8 is fixed to the lid 2, preferably by means of a screw, rivet or welded joint (not shown). In a similar manner, the second arm 9 is fixed to a partition 11 between the storage compartment 6 of the roof and the luggage compartment 7. The arms, 8 and 9, extend through an opening 13 in the lid 2, so that the axis of rotation formed by the shaft 10 is arranged above the plane formed by the lid 2, according to the above explanation. The elements of the hinge parts, 8 and 9, which extend above the lid 2, are preferably hidden due to the fact that they are covered by the bracket 5, which also may accommodate a brake light for the vehicle.

Figure 4:
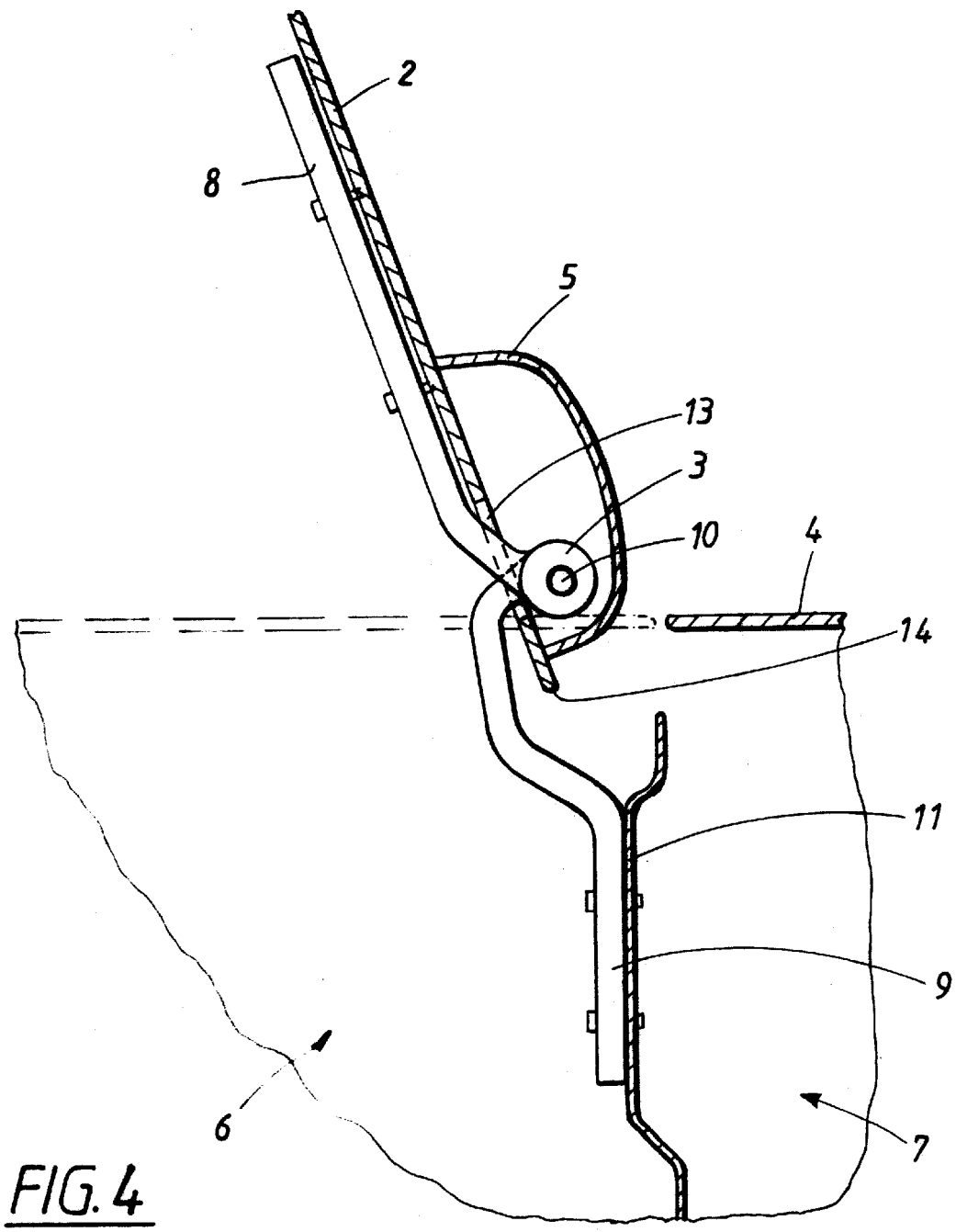
FIG. 4 is a side, elevational, partial sectional view of the hinge arrangement shown in FIG. 3 in a second condition.

FIG. 4 is a side view showing the present invention when the lid 2 has been swung to its raised position, which is carried out during raising and lowering of the roof. As is evident from the drawing, the two hinge arms, 8 and 9, have been swung in relation to each other until the lid 2 has reached its raised position. It is also evident that no part of the hinge 3 penetrates into the space which issued as a luggage compartment 7. Consequently, no part of the luggage compartment 7 has to be used unnecessarily for accommodating the hinge arrangement according to the present invention. Furthermore, the edge 14 of the lid 2 which is adjacent to the luggage compartment lid 4 is brought from its normal position (corresponding to the lid 2 of the roof being closed) to a position just below and in front of that normal position. In this manner, no part of the lid 2 is positioned above the luggage compartment lid 4 when the lid 2 is open, which in turn results in the luggage compartment lid 4 being allowed to be open at the same time as the lid 2 of the roof is open.

Figure 5:
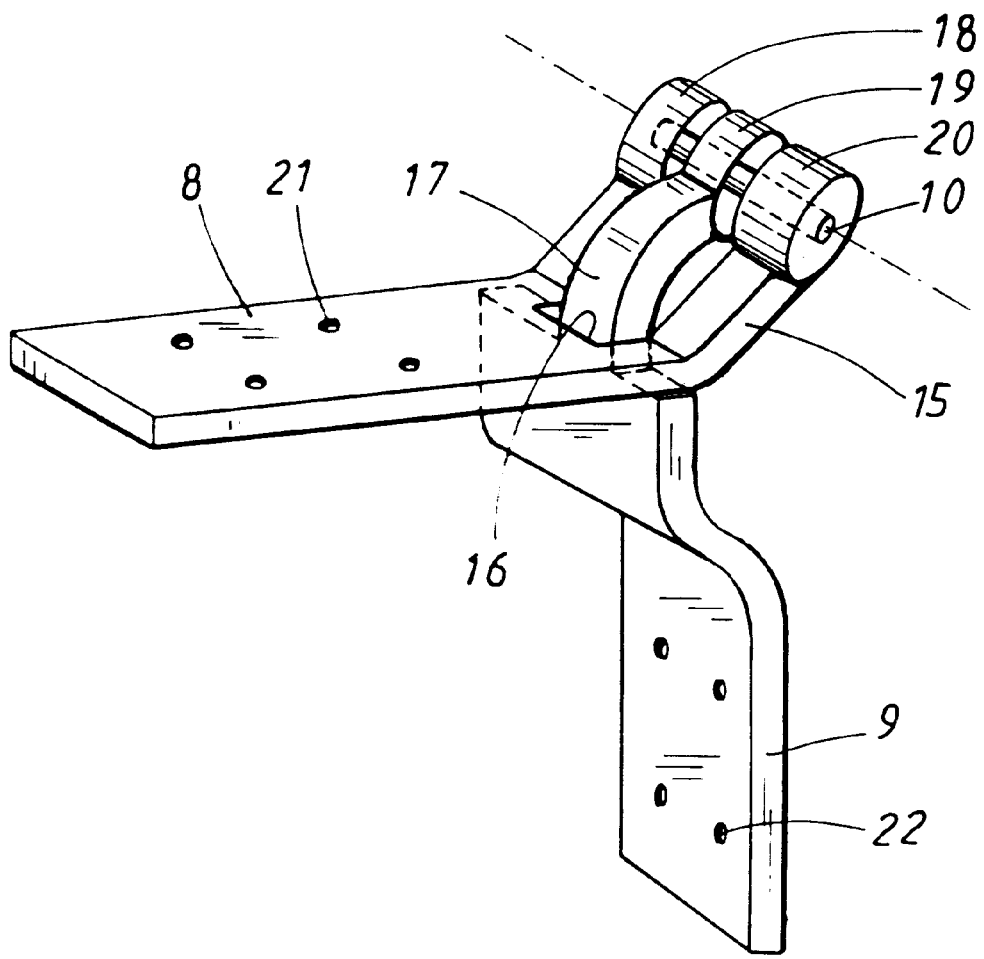
FIG. 5 is a perspective view of the hinge arrangement shown in FIGS. 3 and 4.

FIG. 5 illustrates a hinge 3 according to the present invention. The first arm 8 is preferably designed as a flat iron element. One of the end sections 15 of the arm is slightly bent upwards. The end section 15 is fork-shaped and is designed with a recess 16 which accommodates an end section 17 of the second arm 9. The end section 17 is slightly narrower than the remaining part of the second arm 9.

The end sections, 15 and 17, of the first arm 8 and the second arm 9 are designed with generally circular sections, 18, 19 and 20, which are provided with through bores which are aligned so as to accommodate a through shaft 10. According to the above explanation, the shaft defines an axis of rotation for the hinge 3, i.e. an axis of rotation about which the arms, 8 and 9, can be rotated with respect to each other. Furthermore, in the case where the arms, 8 and 9, are arranged on the lid 2 and the partition 11, respectively (see FIG. 3), by means of a screw joint or the like, said arms, 8 and 9, are provided with through screw holes 21 and 22, respectively.

Preferably, the shaft 10 constitutes a through pin which can be easily removed and fitted. In this manner, the complete hinge 3 can be arranged in a vehicle by mounting the first arm 8 on the lid of the roof and by mounting the second arm 9 on a partition in the vehicle. After that, the arms, 8 and 9, are brought together and aligned so that the shaft 10 can be inserted.

The invention is not limited to the above-mentioned embodiment, but may be varied within the scope of the subsequent claims. For example, one or several hinges 3 can be used for supporting the lid 2. Furthermore, the distance between the shaft 10 and the upper side of the lid 2 can be varied. Also, it is not essential for the operation of the hinge 3 that it is arranged in connection with a housing 5 according to the above explanation. Finally, the invention may comprise two housings, covering one hinge each, instead of one single housing covering both of the hinges 3 (cf. FIG. 1).

What is claimed is:

1. Apparatus for pivotally supporting a lid having a bottom surface pivotable between an open position and a closed position and disposed in a predetermined plane covering a convertible roof storage compartment in a vehicle, said apparatus comprising a first hinge element having a first end and a second end, said first end of said first hinge element being fixed to said lid, and a second hinge element having a first end and a second end, said first end of said second hinge element being fixed to said vehicle, said second ends of said first and second hinge elements being pivotably arranged about a common pivot axis, said common pivot axis being disposed above said bottom surface of said lid, said lid including an opening and said second ends of said first and second hinge elements protruding at least partially through said opening.

2. The apparatus of claim 1 wherein said predetermined plane of said lid is essentially horizontal when said lid is in said closed position.

3. The apparatus of claim 1 wherein said first ends of said first and second hinge elements comprise flat iron elements and said second ends of said first and second hinge elements comprise a hinge shaft extending therethrough.

4. The apparatus of claim 1 including at least one housing covering said second ends of said first and second hinge elements which protrude at least partially through said opening.

5. Apparatus for pivotally supporting a lid having a bottom surface pivotable between an open position and a closed position and disposed in a predetermined plane covering a convertible roof storage compartment in a vehicle, said apparatus comprising a first hinge element having a first end and a second end, said first end of said first hinge element being fixed to said lid, and a second hinge element having a first end and a second end, said first end of said second hinge element being fixed to said vehicle, said second ends of said first and second hinge elements being pivotably arranged about a common pivot axis, said common Divot axis being disposed above said bottom surface of said lid, said lid including an opening, said second ends of said first and second hinge elements protruding at least partially through said opening, said vehicle including a luggage compartment and a wall separating said luggage compartment from said roof storage compartment, said first end of said second hinge element being fixed to said wall of said vehicle.

* * * * *

UNITED STATES PATENT AND TRADEMARK OFFICE
CERTIFICATE OF CORRECTION

PATENT NO. : 5,904,395
DATED : May 18, 1999
INVENTOR(S) : Wedin

It is certified that error appears in the above-identified patent and that said Letters Patent is hereby corrected as shown below:

Column 6, line 8. "Divot" should read --pivot--.

Signed and Sealed this

Seventh Day of December, 1999

Attest:

Q. TODD DICKINSON

*Attesting Officer*  *Acting Commissioner of Patents and Trademarks*